United States Patent [19]

Schoettle et al.

[11] Patent Number: 5,114,008
[45] Date of Patent: May 19, 1992

[54] CASSETTE CONTAINER HAVING INNER REINFORCING EDGE

[75] Inventors: Klaus Schoettle, Heidelberg; Gerald-Wolfgang Borck, Ludwigshafen; Kurt Schmidts, Schwanau; Bozidar Pavelka, Willstaett, all of Fed. Rep. of Germany

[73] Assignee: BASF Aktiengesellschaft, Ludwigshafen, Fed. Rep. of Germany

[21] Appl. No.: 600,162

[22] Filed: Oct. 22, 1990

Related U.S. Application Data

[63] Continuation of Ser. No. 400,410, Aug. 30, 1989, abandoned.

[30] Foreign Application Priority Data

Sep. 2, 1988 [DE] Fed. Rep. of Germany ... 8811110[U]

[51] Int. Cl.⁵ .......................................... B65D 85/672
[52] U.S. Cl. .................................. 206/387; 206/45.14
[58] Field of Search ............... 206/387, 493, 45.15, 206/45.14

[56] References Cited

U.S. PATENT DOCUMENTS 3,272,325  9/1966  Schoenmakers .
3,978,985  9/1976  Zinnbauer ............................ 206/387
4,054,206  10/1977  Kobayashi et al. .................. 206/387
4,184,594  1/1980  Hehn .................................... 206/387
4,231,474  11/1980  Takahashi ............................ 206/387
4,235,334  11/1980  Ahn ...................................... 206/387
4,291,801  9/1981  Basili et al. ......................... 206/387
4,293,266  10/1981  St. Lawrence et al. ......... 206/387 X
4,363,403  12/1982  Raucci, Jr. et al. ................ 206/387
4,457,428  7/1984  Saito .................................. 206/387 X
4,593,814  6/1986  Hagiwara et al. ................... 206/387
4,753,347  6/1988  Bellante et al. ...................... 206/387

FOREIGN PATENT DOCUMENTS 3222333  12/1983  Fed. Rep. of Germany ...... 206/387
2514187  4/1983  France ............................... 206/387

Primary Examiner—Bryon P. Gehman
Attorney, Agent, or Firm—Keil & Weinkauf

[57] ABSTRACT

A container for cassettes is provided with at least one reinforcing edge substantially close to and parallel to back, front and/or side walls, and, if necessary, with reinforcing ribs between reinforcing edge and the adjacent wall. Ejection points for production of the container by injection molding are located along the reinforcing edge(s), for example at the connection points with the reinforcing ribs. The container can be used for any article having a substantially right parallelepiped shape.

8 Claims, 1 Drawing Sheet

CASSETTE CONTAINER HAVING INNER REINFORCING EDGE

This application is a continuation of application Ser. No. 07/400,410, filed on Aug. 30, 1989 now abandoned.

BACKGROUND OF THE INVENTION

The present invention relates to a container, having a right parallelepiped shape, for cassettes, in particular compact cassettes, comprising a bottom part, which possesses a bottom wall, at least one back and/or front wall and bottom part side walls, and a lid part, which consists of at least one lid wall.

Such cassette containers or boxes are disclosed in, for example, German Published Application DAS 1,300,864. They generally consist of thermoplastics, for example polystyrene, and, for reasons of material saving, are not very stable, particularly when they are packed as a stack in the empty or full state.

In the production of these known containers, flat ejectors engage the edges of the side walls of the lid part or of the bottom part and further ejectors engage the stop pins arranged on the bottom part, for the reels in the cassette.

SUMMARY OF THE INVENTION

It is an object of the present invention to improve such containers with regard to simple production and stability in particular to bending forces.

We have found that this object is achieved, according to the invention, by a container, having a right parallelepiped shape, for cassettes, in particular compact cassettes, comprising a bottom part, which possesses a bottom wall, at least one back and/or front wall and bottom part side walls, and a lid part, which consists of at least one lid wall, if one or more reinforcing edges are arranged on the inner surface of the bottom wall substantially close to and substantially parallel to the back wall and/or a front wall.

This made it possible substantially to increase the breaking strength and flexural strength of the container.

In another embodiment, further reinforcing edges may be provided close to and parallel to the side walls.

This permits a rectangular or U shape, which substantially increases the flexural strength in the diagonal direction. In a practical embodiment, the reinforcing edges are arranged at a predetermined distance from the back wall or front wall or from the side walls, and ejection points for ejectors for production by injection molding are formed along the said reinforcing edges.

Furthermore, the reinforcing edges may be connected to one another close to the back and/or front wall.

This makes it possible to produce an advantageous rectangular or U shape. Advantageously, reinforcing ribs, in particular of substantially trapezoidal shape, can also be mounted between the relevant reinforcing edge and the adjacent wall, with the result that the strength and flexural strength are further substantially increased.

In practice, the ejection points may be located at the connection points between the reinforcing edge and reinforcing ribs.

Advantageously, it is also possible for the ejection points or the reinforcing edges or both to serve as supporting studs or supporting webs for the cassette, if they have a suitable height above the bottom wall and are arranged at a suitable distance from the lid wall, with the result that the filled container has even higher strength and flexural strength.

The reinforcing edges may additionally be arranged on the surface of the lid wall.

DESCRIPTION OF THE PREFERRED EMBODIMENT

Figure 1:
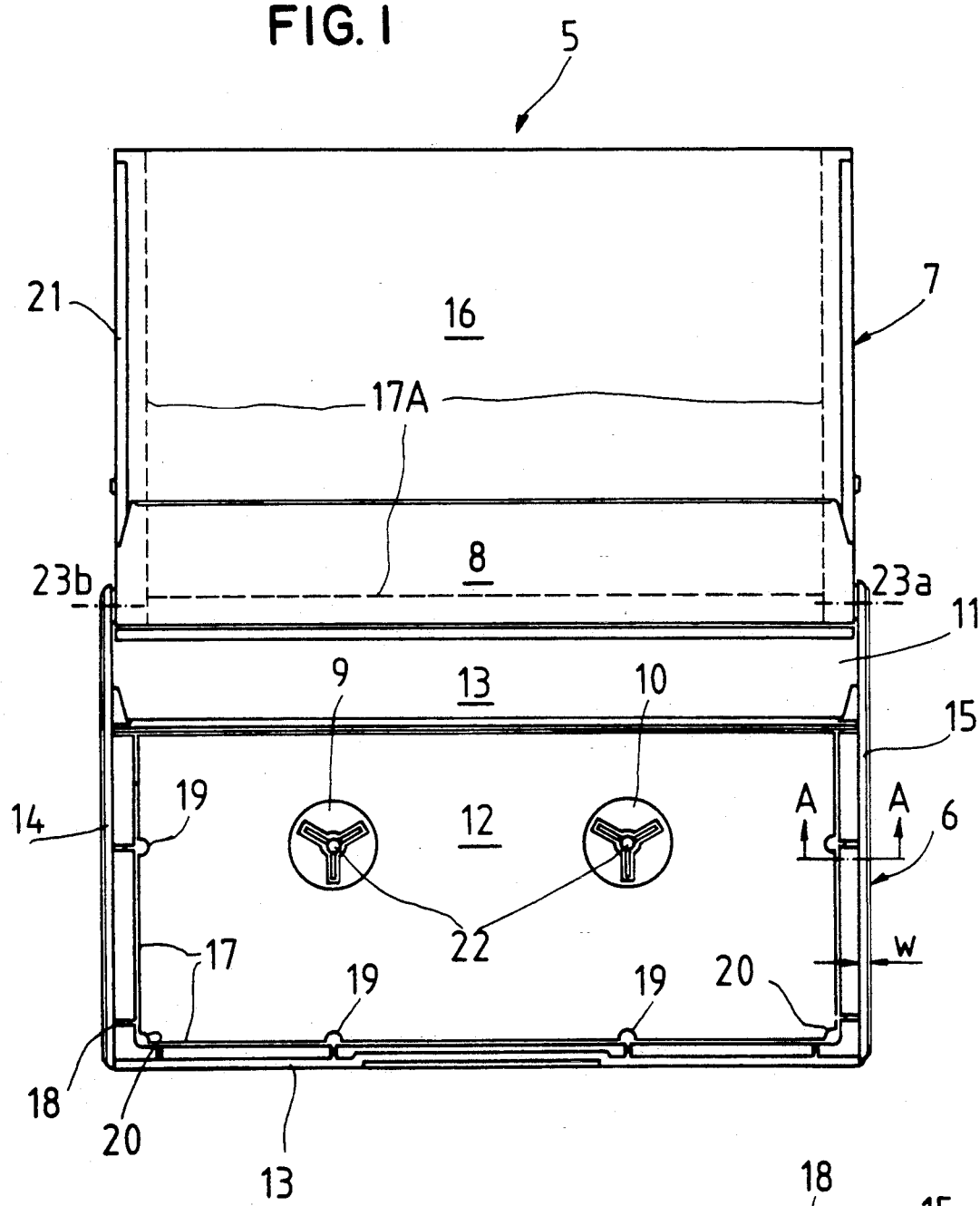
FIG. 1 shows a plan view of an open cassette box for compact cassettes.

The container 5 consists of bottom part 6 and lid part 7, the lid part 7 having a pocket 8 for the cassette and the bottom part having stop pins 9 and 10. The wall of the pocket 8 fits when container 5 is closed.

The bottom part 6 consists of bottom wall 12, back wall 13 and side walls 14 and 15. The lid part 7 essentially consists of the stated pocket 8, the lid wall 16 and low side wall webs 21. Bottom and lid parts 6 and 7 are pivotably connected to one another by hinge means 23$a$ and 23$b$.

Figure 2:
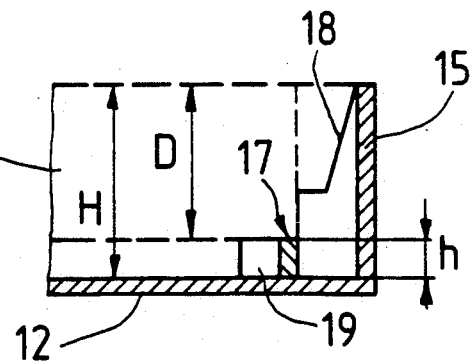
FIG. 2 shows the cutaway view designated A—A in FIG. 1.

A reinforcing edge or reinforcing web 17 is formed on the inner surface of bottom wall 12, substantially parallel to the back wall 13 and to the side walls 14 and 15. Reinforcing ribs 18, which, as shown in FIG. 2, are roughly trapezoidal, but, for example, may also be substantially triangular, are provided between edge 17 and the adjacent wall. The thickness of the edge 17 and the ribs 18 is roughly equal but may well be different. In FIG. 1, a total of eight reinforcing ribs 18 are provided, including two on each of the side walls 14 and 15, the remaining four being on the back wall 13. An ejection point (thicker area or pin 19) is provided on most connection points of the edge 17 with each rib 18. By using such ejection points 19, round ejectors can advantageously be used during injection molding. A further two ejection points 20 are provided on the connection points of the edge 17 (corner points) and further points 22 are provided in the center of the stop pins 9 and 10.

In polystyrene containers for compact cassettes, the height h of the edge 17 is about 2.6 mm, with a wall thickness W of 1.5 mm and a thickness d of about 0.5 mm. The internal height H between bottom wall 12 and lid wall 16 in the closed container 5 advantageously corresponds to the thickness D (referred to in the claims as distance from the lid wall 16) of the compact cassette K (outside its greater height in the head area) plus the height h of the edge 17, i.e. H=D+h, so that the cassette rests on the edge 17 and the ejection points 19 and 20.

The expression "the thickness of the cassette" as used hereinafter is to be interpreted as defined above, that is it is meant to exclude the greater magnitude which it has in the head area.

Although the above example shows the reinforcing edges 17 and/or ribs only on the bottom part 6, they may also be provided correspondingly and in a suitable manner on the lid part 17 (cf. dashed lines 17A).

When such reinforcing edges and reinforcing ribs are used in transparent containers, the edge 17 may take the form of a design means.

The invention has been described above with reference to a specific container. Other container constructions, which likewise have a right parallelepiped shape and are suitable for the storage of cassettes and which, for similar or other reasons, may be equipped with reinforcing webs, reinforcing edges, reinforcing ribs and ejection pins, are of course also possible.

A container for cassettes is provided with one or more reinforcing edges close to and parallel to back walls, front walls and/or side walls, and, if necessary with reinforcing ribs between reinforcing edge and the adjacent wall. Ejection points for production of the container by injection molding are located along the reinforcing edge or edges, for example at the connection points with the reinforcing ribs. The article may be used for any container having a right parallelepiped shape.

By providing at least the reinforcing edge as a support web for the cassette, a vibration-proof and transit-proof conainer can be realized.

We claim:

1. A container, having a right parallelepiped shape, for a cassette, comprising a bottom part which has a bottom wall, at least one of a back wall and a front wall, and bottom part side walls, and a lid part which consists of at least one lid wall, wherein a reinforcing edge is arranged on the inner surface of the bottom wall substantially paralleling at least one of said back wall and front wall and each of the side walls in nesting fashion on the inside thereof and at a close spacing thereto, the reinforcing edge having a height above the bottom wall which is lower than the height of the walls of said bottom part so that said reinforcing edge serves as a frame-like support for the cassette bottom when the cassette is inserted into the container.

2. A container as claimed in claim 1, wherein ejection points for ejectors for production by injection molding are provided along said reinforcing edge.

3. A container as claimed in claim 2, wherein reinforcing ribs are provided between the reinforcing edge and the adjacent wall.

4. A container as claimed in claim 3, wherein the reinforcing ribs have a substantially trapezoidal shape.

5. A container as claimed in claim 3, wherein the ejection points are located at the connection points between reinforcing edge and reinforcing ribs.

6. A container as claimed in claim 2, wherein at least the ejection points are formed as studs which have a height above the bottom wall and are arranged at a distance from the lid wall so as to serve as supports for the cassette for which the container is designed.

7. A container as claimed in claim 1, wherein additional reinforcing edges are provided on the surface of the lid wall.

8. A container as claimed in claim 1, wherein the difference in height between the walls of said lower part, and the reinforcing edge, corresponds to the thickness of the cassette for which the container is designed.

* * * * *